United States Patent
Suzuki et al.

(10) Patent No.: US 7,354,048 B2
(45) Date of Patent: Apr. 8, 2008

(54) STABILIZER CONTROL UNIT

(75) Inventors: Katsumi Suzuki, Takahama (JP); Akiya Taneda, Anjo (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 238 days.

(21) Appl. No.: 10/565,969

(22) PCT Filed: Jul. 27, 2004

(86) PCT No.: PCT/JP2004/010654
§ 371 (c)(1),
(2), (4) Date: Jan. 26, 2006

(87) PCT Pub. No.: WO2005/012012
PCT Pub. Date: Feb. 10, 2005

(65) Prior Publication Data
US 2006/0249919 A1    Nov. 9, 2006

(30) Foreign Application Priority Data
Jul. 30, 2003    (JP) .............................. 2003-282999

(51) Int. Cl.
B60G 17/005 (2006.01)
(52) U.S. Cl. ............................... 280/5.502; 280/5.508; 280/124.106
(58) Field of Classification Search ............. 280/5.501, 280/5.502, 5.506, 5.508, 124.106, 124.107
See application file for complete search history.

(56) References Cited

U.S. PATENT DOCUMENTS

| | | | | |
|---|---|---|---|---|
| 5,032,997 A | * | 7/1991 | Kawagoe | ................... 701/48 |
| 5,251,926 A | * | 10/1993 | Aulerich et al. | ...... 280/124.152 |
| 6,022,030 A | * | 2/2000 | Fehring | ................... 280/5.511 |
| 6,149,166 A | * | 11/2000 | Struss et al. | ............ 280/5.511 |
| 6,942,227 B2 | * | 9/2005 | Heller et al. | ............. 280/5.502 |
| 2003/0094774 A1 | * | 5/2003 | Burdock | ................. 280/5.502 |

FOREIGN PATENT DOCUMENTS

| | | |
|---|---|---|
| JP | 64-74115 A | 3/1989 |
| JP | 7-117438 A | 5/1995 |
| JP | 2522037 B2 | 5/1996 |
| JP | 8-142893 A | 6/1996 |
| JP | 2002-518245 A | 6/2002 |
| JP | 2003-80916 A | 3/2003 |
| JP | 2003-226127 A | 8/2003 |

* cited by examiner

*Primary Examiner*—Paul N. Dickson
*Assistant Examiner*—Robert A. Coker
(74) *Attorney, Agent, or Firm*—Buchanan Ingersoll & Rooney PC

(57) ABSTRACT

A stabilizer control apparatus operating to contort stabilizer bars ensures the stability of a vehicle, even in the event that one of the front and rear stabilizer bars of the vehicle is stuck in a contorted state.

The stabilizer control apparatus includes frontward and rearward stabilizer bars 25 and 35, frontward and rearward stabilizer actuators 20, 30 that can be driven to contort the stabilizer bars 25 and 35 between their two ends, a lateral G sensor 42 or the like for detecting rolling of the vehicle and furthermore an ECU 50 that outputs to the stabilizer actuators 20 and 30 a driving signal to cause a resisting rolling moment countering rolling of the vehicle and that moreover, in the event that the irregularity is detected that one of the frontward and rearward stabilizer bars 25 and 35 is stuck in a contorted state, outputs to the stabilizer actuators 20 and 30 a driving signal to contort the other one of the frontward and rearward stabilizer bars 25 and 35 in the direction compensating that rolling moment.

14 Claims, 5 Drawing Sheets

STABILIZER CONTROL UNIT

TECHNICAL FIELD

The present invention relates to a stabilizer control apparatus for achieving stabilization of rolling in a running vehicle.

BACKGROUND ART

Conventionally, this type of stabilizer control apparatuses is known from after-mentioned Patent Document 1. In this conventional stabilizer control apparatus, a turning actuator is arranged between the two halves of a divided stabilizer bar. Then, in the event that the vehicle rolls, for example while the vehicle is rolling or the like, the turning actuator applies a contorting pre-stress between the stabilizer halves and applies a resisting moment to the vehicle. As a result, it is possible to stabilize the vehicle with respect to rolling moments.

However, in this conventional stabilizer control apparatus, there is the risk that the vehicle front stays always tilted in the left or the right direction when the turning actuator is stuck while the stabilizer disposed at the front wheels of the vehicle is contorted (even though it is not necessary to apply a resisting moment to the vehicle).

Patent Document 1: Japanese Patent Laid-Open No. 2002-518245 A (see page 2 to 10, FIG. 2)

DISCLOSURE OF INVENTION

Problem to be Solved by the Invention

It is an object of the present invention to provide a stabilizer control apparatus that is operated to contort stabilizer bars, in which the stability of the vehicle is ensured even in the event that one of the frontward and rearward stabilizer bars of the vehicle is stuck in a contorted state.

Means for Solving Problem

A technological means in accordance with the present invention devised to solve the above-described problem is a configuration including a first stabilizer bar disposed at either the front wheels or the rear wheels of a vehicle; a second stabilizer bar disposed at the other of the front wheels and the rear wheels; a first driving means, disposed between the two ends of the first stabilizer bar, that can be driven so as to contort the first stabilizer bar between its two ends; a second driving means, disposed between the two ends of the second stabilizer bar, that can be driven so as to contort the second stabilizer bar between its two ends; a roll detecting means for detecting rolling of the vehicle; a first control means, which, in the event that the roll detecting means has detected rolling of the vehicle, outputs to at least one of the first driving means and the second driving means a driving signal contorting at least one of the first stabilizer bar and the second stabilizer bar, so that a resisting rolling moment that counters the rolling acts on the vehicle; and a second control means, which, in the event that an irregularity is detected that one of the first stabilizer bar and the second stabilizer bar is stuck in a contorted state such that a rolling moment to one side acts on the vehicle, outputs a driving signal contorting the other of the first stabilizer bar and the second stabilizer bar in a direction where the rolling moment to the one side is compensated, to the first driving means or the second driving means that drives the other stabilizer bar.

With this configuration, even in the event that the irregularity has occurred that one of the first stabilizer bar and the second stabilizer bar is stuck in a contorted state so that a rolling moment in one direction acts on the vehicle, it is possible to compensate the rolling moment acting on the vehicle between the first stabilizer bar and the second stabilizer bar and it can be avoided that the vehicle tilts to the left or right. Thus, the stability of the vehicle can be ensured.

Furthermore, a technological means in accordance with the present invention is a configuration provided with a first stabilizer bar disposed at either the front wheels or the rear wheels of a vehicle; a second stabilizer bar disposed at the other of the front wheels and the rear wheels; a first driving means, disposed between the two ends of the first stabilizer bar, that can be driven so as to contort the first stabilizer bar between its two ends; a second driving means, disposed between the two ends of the second stabilizer bar, that can be driven so as to contort the second stabilizer bar between its two ends; a roll detecting means for detecting rolling of the vehicle; a first control means, which, in the event that the roll detecting means has detected rolling of the vehicle, outputs to at least one of the first driving means and the second driving means a driving signal contorting at least one of the first stabilizer bar and the second stabilizer bar, so that a resisting rolling moment that counters the rolling acts on the vehicle; and a second control means, which, in the event that an irregularity is detected that one of the first stabilizer bar and the second stabilizer bar is stuck in a contorted state, outputs a driving signal contorting the other of the first stabilizer bar and the second stabilizer bar such that tilting of the chassis of the vehicle is suppressed, to the first driving means or the second driving means that drives the other stabilizer bar.

With this configuration, even in the event that the irregularity occurs that one of the first stabilizer bar and the second stabilizer bar is stuck in a contorted state, the other of the first stabilizer bar and the second stabilizer bar in the vehicle is driven to be contorted in a way that the tilting of the chassis of the vehicle is suppressed, so that it can be avoided that the vehicle tilts to the left or right. Thus, the stability of the vehicle can be ensured.

In the above-described configuration of the technological means according to the present invention, it is preferable that in the event that the irregularity has been detected, the second control means outputs a driving signal of an amount that corresponds to the driving amount of the first driving means or the second driving means that drives one of the first stabilizer bar and the second stabilizer bar where the irregularity was detected, to the first driving means or the second driving means driving the other of the first stabilizer bar or the second stabilizer bar.

With this configuration, the control to avoid tilting of the vehicle is performed by matching the amount of driving of the first stabilizer bar or the second stabilizer bar where the irregularity was detected. Therefore it is possible to ensure stability even better.

In the above-described configuration of the technological means according to the present invention, it is preferable to provide contortion detecting means for detecting the degree of contortion of the first stabilizer bar and the second stabilizer bar; and that the second control means detects the irregularity of the first stabilizer bar from a set contortion value of the first stabilizer bar in accordance with the driving signal of the first control means and from the detection result of the contortion detection means, and detects the irregularity of the second stabilizer bar from a set contortion value of the second stabilizer bar in accordance with the driving signal of the first control means and from the detection result of the contortion detection means.

With this configuration, it is possible to detect an irregularity of the first stabilizer bar or the second stabilizer bar.

A technological means in accordance with the present invention is a configuration provided with a first stabilizer bar disposed at either the front wheels or the rear wheels of a vehicle; a second stabilizer bar disposed at the other of the front wheels and the rear wheels; a first driving means, disposed between the two ends of the first stabilizer bar, that can be driven so as to contort the first stabilizer bar between its two ends; a second driving means, disposed between the two ends of the second stabilizer bar, that can be driven so as to contort the second stabilizer bar between its two ends; a roll detecting means for detecting rolling of the vehicle; a first control means, which, in the event that the roll detecting means has detected rolling of the vehicle, outputs to the first driving means and the second driving means a driving signal contorting the first stabilizer bar and the second stabilizer bar, so that a resisting rolling moment that counters the rolling acts on the vehicle; and a second control means, which, in the event that an irregularity is detected that the first stabilizer bar is stuck in a contorted state such that a rolling moment in one direction acts on the vehicle, outputs to the second driving means a driving signal contorting the second stabilizer bar such that a rolling moment in the other direction countering the rolling moment in the one direction acts on the vehicle.

With this configuration, even in the case that the irregularity occurs that the first stabilizer bar disposed at either the front wheels or the rear wheels of the vehicle is stuck in a contorted state that lets a rolling moment in one direction act on the vehicle, a rolling moment in the other direction is applied to the second stabilizer bar disposed at the other of the rear wheels and the front wheels, resisting the rolling moment from the one direction, so that it is possible to avoid a state in which the vehicle tilts to the left or right. Therefore it is possible to ensure the stability of the vehicle.

Moreover, a technological means in accordance with the present invention is a configuration provided with a first stabilizer bar disposed at either the front wheels or the rear wheels of a vehicle; a second stabilizer bar disposed at the other of the front wheels and the rear wheels; a first driving means, disposed between the two ends of the first stabilizer bar, that can be driven so as to contort the first stabilizer bar between its two ends; a second driving means, disposed between the two ends of the second stabilizer bar, that can be driven so as to contort the second stabilizer bar between its two ends; a roll detecting means for detecting rolling of the vehicle; a first control means, which, in the event that the roll detecting means has detected rolling of the vehicle, outputs to the first driving means and the second driving means a driving signal contorting the first stabilizer bar and the second stabilizer bar, so that a resisting rolling moment that counters the rolling acts on the vehicle; and a second control means, which, in the event that an irregularity is detected that the first stabilizer bar is stuck in a contorted state, outputs to the second driving means a driving signal contorting the second stabilizer bar such that tilting of the chassis of the vehicle is suppressed.

With this configuration, even in the event that the irregularity occurs that the first stabilizer bar disposed at the front wheels or the rear wheels of the vehicle is stuck in a contorted state, the second stabilizer bar attached the other of the front and rear wheels is driven such that tilting of the chassis of the vehicle is suppressed, so that it is possible to avoid a state in which the vehicle tilts to the left or right. Therefore it is possible to ensure the stability of the vehicle.

In the above-described configuration of the technological means according to the present invention, it is preferable to further provide a contortion detection means for detecting the degree of contortion of the first stabilizer bar, and that the second control means detects the irregularity from a set contortion value of the first stabilizer bar in accordance with the driving signal of the first control means and from the detection result of the contortion detection means.

With this configuration, it is possible to detect an irregularity of the first stabilizer bar.

In the above-described configuration of the technological means according to the present invention, it is preferable to further provide an alarm device, and that the second control means outputs a signal for issuing an alarm to the alarm device in the event that an irregularity is detected.

With this configuration, when an irregularity occurs, the driver can be alerted to it.

BEST MODE FOR CARRYING OUT THE INVENTION

Hereinafter, embodiments of the present invention are explained, referring to the figures. FIG. 1 is a block diagram showing the electric configuration of a stabilizer control apparatus 10 according to an embodiment of the present invention. FIG. 2 is a figure that shows a vehicle 1 equipped with the stabilizer control apparatus 10. FIG. 3 is a figure that shows the configuration of a front stabilizer actuator 20 (hereinafter referred to as frontward actuator 20), with which the stabilizer control apparatus 10 is provided. FIGS. 4 to 7 are figures that illustrate operating states of the stabilizer control apparatus 10. The direction coming perpendicularly out of the paper plane in FIG. 2 is the travel direction of the vehicle 1. When referring to the rearward, frontward, left and right directions below, the travel direction of he vehicle 1 is regarded as the frontward direction.

As shown in FIGS. 1 and 2, the stabilizer control apparatus 10 includes for example a frontward stabilizer bar 25, a rearward stabilizer bar 35, the frontward actuator 20, a rearward stabilizer actuator 30 (hereinafter referred to as rearward actuator 30), a steering angle sensor 41 (a means for detecting rolling), a lateral G sensor 42 (a means for detecting rolling), a yaw rate sensor 43 (a means for detecting rolling), a torque sensor 44 (a means for detecting rolling), a strain sensor 45 (a means for detecting rolling), an ECU 50 (first control means and second control means), and a rotation angle sensor 60 (a means for detecting the degree of contortion). According to this embodiment, either the frontward stabilizer bar 25 or the rearward stabilizer bar 35 corresponds to the first stabilizer bar, and the other one corresponds to the second stabilizer bar. Furthermore, either the frontward actuator 20 or the rearward actuator 30 corresponds to the first driving means, and the other one to the second driving means.

As shown in FIG. 2, the frontward stabilizer bar 25 and the rearward stabilizer bar 35 are respectively attached on the side of the front wheels 2 and on the side of the rear wheels 3 of the vehicle 1.

The frontward stabilizer bar 25 is on both sides linked to the front wheels 2, and is linked to the chassis 4 by left and right supporting units 26, 27 via an arm or the like (not shown in the figures). In the same manner, the rearward stabilizer 35 is at both sides connected to the rear wheels 3 and the supporting units 26, 27 located at the left and right sides and via an arm, for example (not shown in the figures) connected to the chassis 4.

As shown in detail in FIG. 3, the frontward stabilizer bar 25 is divided to a left side bar 25a and a right side bar 25b. The frontward actuator 20 is arranged in between, that is, between the two ends of the frontward stabilizer bars 25. The left side bar 25a is linked to a driving side 20a within the actuator 20 and the right side bar 25b is linked to a housing side 20b of the actuator 20. But they can also be linked in reverse order.

The driving side 20a of the actuator 20 is provided with a motor 21 serving as the driving source, and a speed reduction mechanism 22, for example.

The motor 21 is connected to the ECU 50, as shown in FIG. 1, and is driven by a driving signal from the ECU 50. The motor 21 is a brushless motor with multiple poles, including a motor stator 21a, a motor rotor 21b and so on, disposed around the axis of the left side bar 25a.

The speed reduction mechanism 22 reduces the driving force of the motor 21 and transmits it to the frontward stabilizer bar 25. It can be configured as an epicyclic gear mechanism with a plurality of sun gears, planetary gears and ring gears, but it is not limited to this configuration. Next, when the motor 21 is running and transmits the driving force to the frontward stabilizer bar 25 via the speed reduction mechanism 22, the left side bar 25a and the right side bar 25b are rotating in opposite circumferential directions with respect to their longitudinal direction. In other words, the frontward actuator 20 is driving the frontward stabilizer bar 25 such that it contorts between its two ends.

Inside the motor 21 of frontward actuator 20, a rotation angle sensor 60 is attached. As shown in FIG. 1, the rotation angle sensor 60 is connected to the ECU 50. Here, the rotation angle sensor 60, which is provided with a hall element, detects the rotation of a motor rotor 21b, that is, the amount of rotations of the motor 21. In other words, the rotation angle sensor 60 detects the circumferential rotation angle between the two ends of the frontward stabilizer bar 25, that is, it detects the degree of contortion. It also outputs the detection result to the ECU 50.

Furthermore, although not shown in FIG. 3, a torque sensor 44 (see FIG. 1) and a strain sensor 45 (see FIG. 1) are disposed on the right side bar 25b near the speed reduction mechanism 22 of the frontward actuator 20. As shown in FIG. 1, the torque sensor 44 and the strain sensor 45 are connected to the ECU 50. These sensors detect the torque and the distortion in the right side bar 25b when there is rolling, such as when the vehicle 1 turns. In other words, they detect rolling of the vehicle 1 and output the detection result to the ECU 50.

Moreover, as shown in FIG. 2, the rearward actuator 30 is attached between the two ends of the rearward stabilizer 35, just like the frontward stabilizer 25. The structure of the rearward actuator 30 is similar to that of the frontward actuator 20, so its further explanation is omitted.

The steering angle sensor 41 shown in FIG. 1 is disposed near a steering system of the vehicle 1 (not shown) and connected to the ECU 50. The steering angle sensor 41 has a known configuration detecting the steering angle of the steering system and outputs the detection signal to the ECU 50.

A lateral G sensor 42 with which the vehicle 1 is provided is connected to the ECU 50. The lateral G sensor 42 has a known configuration for detecting the lateral acceleration of the vehicle 1 and its detection signal is output to the ECU 50. As for the lateral acceleration of the vehicle 1, there is the acceleration due the rolling when the vehicle 1 is turning, and the acceleration due to the rolling when the vehicle 1 is exposed to crosswind.

The yaw rate sensor 43 with which the vehicle 1 is provided is connected to the ECU 50. The yaw rate sensor 43 has a known configuration for detecting the angular velocity of the vehicle 1 and its detection signal is output to the ECU 50.

When the ECU 50 has detected rolling of the vehicle 1 from the detection signal inputs by the roll detection means, such as the lateral G sensor 42, then the ECU 50 outputs to the frontward actuator 20 and the rearward actuator 30 a driving signal that contorts the frontward stabilizer bar 25 and the rearward stabilizer bar, causing a resisting rolling moment countering the rolling of vehicle 1.

And if the ECU 50 detects an irregularity, such as that the frontward stabilizer bar 25 is stuck in a contorted state so that a rolling moment acts on the vehicle 1 in the left or the right direction, then the ECU 50 outputs to the rearward actuator 30 a driving signal that contorts the rearward stabilizer bar 35, causing a rolling moment in the opposite direction countering that rolling moment (that is, the other one of the right and left directions of the vehicle 1). Also the frontward actuator 20 is controlled like this, in the event that the rearward stabilizer bar 35 is stuck.

That is to say, in the event that the irregularity is detected that either the frontward stabilizer bar 25 or the rearward stabilizer bar 35 is stuck in a contorted state, so that a rolling moment acts on the vehicle 1 in one direction (the left or the right direction), then the ECU 50 outputs a driving signal that contorts the other one of the frontward stabilizer bar 25 and the rearward stabilizer bar 35 in a direction that compensates the rolling moment in that direction, to the frontward actuator 20 or the rearward actuator 30 driving that other stabilizer bar. In other words, in the event that an irregularity is detected where either one of the frontward stabilizer bar 25 or the rearward stabilizer bar 35 is stuck in a contorted state, the ECU outputs a driving signal contorting the other one of the frontward stabilizer bar 25 and the rearward stabilizer bar 35 to the frontward actuator 20 or the rearward actuator 30 driving that other stabilizer bar, so as to suppress a tilting of the chassis 4 of the vehicle 1. The following is a detailed explanation of the control with the ECU 50.

As a display means 70, a lamp, which is connected to the ECU 50, is arranged in the instrument panel of the vehicle 1. In the event that an irregularity is detected, the ECU 50 issues an alarm, in form of a signal sent to the display means 70. Through this alarm, the user is alerted to the irregularity. This display means 70 is not limited to the configuration of the present embodiment, and can also be the display of a navigation system or issued in form of a sound.

The processing flow of the ECU 50 is explained with reference to FIG. 4. This processing flow is started for example by operating the ignition of the vehicle 1.

In Step S100, the detection signals of all sensors are input into the ECU 50 as an initialization process. Then, the procedure advances to Step In Step S101, the ECU 50 decides whether or not rolling of the vehicle 1 has occurred (whether rolling of the vehicle 1 has been detected). This decision is made from the detection values of the steering sensor 41, the lateral G sensor 42, the yaw rate sensor 43, the torque sensor 44 and the strain sensor 45. This decision can be made by setting individual threshold values for the respective output values of the sensors, but it is also possible to make a compound decision from all output values. It is furthermore possible to provide a vehicle speed sensor, and take into account the vehicle speed detected by the vehicle speed sensor for the decision. If the ECU 50 decides in Step S101 that no rolling has occurred, then the procedure returns to Step S100. If it decides in Step S101 that rolling has occurred, then the procedure advances to Step S102.

FIG. 5 is an operation diagram for the case that the vehicle 1 turns in the left direction (direction R in FIG. 2) and the vehicle 1 rolls to the right. In FIG. 5, the normal state of the chassis 4, corresponding to FIG. 2 where no rolling occurs, is marked with a dot-dot-dashed line, whereas the state of the chassis 4 tilted due to rolling is marked with a solid line. As shown in FIG. 5, the chassis 4 tilts to the right, and the frontward stabilizer bar 25 and the rearward stabilizer bar 35 are twisted due to this tilt.

In Step S102, the ECU 50 calculates a driving signal that is output to the frontward actuator 20 and the rearward actuator 30. In other words, it calculates the contortion amount (the rotation angle) contorting the frontward stabilizer bar 25 and the rearward stabilizer bar 35 such that they apply a rolling moment countering the rolling of the vehicle 1, and it calculates a corresponding driving signal amount (for example a current value) that is input to the frontward actuator 20 and the rearward actuator 30. Then the procedure advances to Step S103.

In Step S103, the ECU 50 outputs a driving signal to the frontward actuator 20 and the rearward actuator 30. Then the procedure advances to Step S104.

When the ECU 50 outputs the driving signal, the frontward actuator 20 and the rearward actuator 30 actuate the motors 21 and contort the frontward stabilizer bar 25 and the rearward stabilizer bar 35 via the speed reduction mechanism 22. The direction of contortion is the direction T shown in FIG. 5. As described above, the frontward actuator 20 and the rearward actuator 30 are driven to cause a resisting moment countering the rolling of the vehicle 1. As a result, the chassis 4 returns to the state shown in FIG. 2.

In Step S104, the ECU 50 decides whether or not an irregularity has occurred in the frontward actuator 20 or the rearward actuator 30. If it decides that no irregularity has occurred, then the procedure returns to Step S100, whereas if it decides that an irregularity has occurred, then the procedure advances to Step S105. Here "irregularity" means, that the frontward actuator 20 or the rearward actuator 30 is defect, so that the frontward stabilizer bar 25 or the rearward stabilizer bar 35 is stuck in a contorted state. Such an irregularity causes a rolling moment that rolls the vehicle 1 in either the left or the right direction. A defect of the frontward actuator 20 or the rearward actuator 30 could be, for example, that the motors 21 cannot be driven anymore, or that the speed reduction device 22 locks and cannot be driven anymore.

This decision is based on the set contortion value (the set rotation angle) of the frontward stabilizer bar 25 or the rearward stabilizer bar 35 in accordance with the driving signal of ECU 50, and the actual rotation angle that is input by the rotation angle sensor 60. That is to say, for example in the event that the ECU 50 sends out a driving signal to contort the frontward stabilizer bar 25 by a set angle α, if the actual contortion rotation angle of the frontward stabilizer bar 25 detected by the rotation angle sensor 60 deviates more than a predetermined angle from the set angle α, then the ECU 50 decides that an irregularity has occurred. The same is true for the rearward stabilizer bar 35. It is also possible to decide that an irregularity occurred when the actual contortion rotation angle deviates by more than a predetermined angle from the set angle α for more than a determined time. The set contortion angle of the frontward stabilizer bar 25 or the rearward stabilizer bar 35 based on the driving signal that is output by the ECU 50 is not limited to a numeric value of that angle, and it may also be a current value serving as the driving signal that is output by the ECU 50.

FIG. 6 illustrates a state in which an irregularity occurred in that the frontward stabilizer bar 25 of the vehicle 1 is stuck while being contorted in the direction U in the figure (forward direction), with respect to the longitudinal direction of the frontward stabilizer bar 25, and in which no external forces act on the vehicle 1 that could cause rolling. In this FIG. 6, the normal state of the chassis 4 corresponding to FIG. 2 is indicated by a dot-dot-dashed line and the actual state is indicated by a solid line. As shown in FIG. 6, the frontward stabilizer bar 25 is stuck in a contorted state in which a rolling moment causing the vehicle 1 to roll left acts on the vehicle 1. As a result, the front of the vehicle 1 tilts to the left.

In the case shown in FIG. 6, in Step S105 the ECU 50 calculates a drive signal to be output to the rearward actuator 30. That is to say, based on the rotation angle of the frontward actuator 20, the rolling moment amount acting on the vehicle 1 that is caused by the frontward stabilizer bar 20 is calculated. Next, a driving signal (for example a current value) with which the rearward stabilizer bar 35 causes a rolling moment of equivalent value, and which is to be sent to the rearward actuator 30 is calculated. Then, the procedure advances to Step S106.

In Step S106, the ECU 50 outputs a driving signal to the rearward actuator 30. This driving signal contorts the rearward stabilizer bar 35 in the direction S (opposite direction) shown in FIG. 6 with respect to the rearward actuator 30. In other words, the ECU 50 outputs such a driving signal that a rolling moment to the right (that is, a rolling moment in a direction that counters the rolling moment to the left applied by the frontward stabilizer bar 25 to the vehicle 1) acts on the vehicle 1. The state after this operation is shown in FIG. 7.

FIG. 7 shows the state after the operation of the rearward actuator 30 of the vehicle 1. In FIG. 7, the normal state of the chassis 4 corresponding to FIG. 2 is indicated by a dot-dot-dashed line and the actual state is indicated by a solid line. As shown in FIG. 7, the front of the chassis 4 tilts to the left, the rear tilts to the right. As a result, when the chassis 4 is viewed as a whole, the tilt of the vehicle body in the horizontal direction is suppressed and it is substantially in a state that is similar to the normal state, as shown in FIG. 2. In other words, the ECU 50 outputs to the rearward actuator 30 a driving signal that contorts the rearward stabilizer bar 35 such that the tilting of the chassis 4 of the vehicle 1 is suppressed.

As described above, in case that an irregularity occurred, such as that the frontward stabilizer bar 25 is stuck in a contorted state as shown in FIG. 6 so that a rolling moment to the left acts on the vehicle 1, the stabilizer control apparatus 10 controls, with the ECU 50, the rearward stabilizer bar 35 such that it applies to the vehicle 1 a rolling moment to the right. That means that between the frontward stabilizer bar 25 and the rearward stabilizer bar 35 of the vehicle 1, the rolling moment acting on the vehicle 1 is canceled. Therefore, it can be avoided that the vehicle 1 assumes a tilted state, even in a case where either the frontward stabilizer bar 25 or the rearward stabilizer bar 35 of the vehicle 1 is stuck in a contorted state. As a result, the stability of the vehicle 1 can be ensured.

Hereinafter, in a Step 107, the ECU 50 outputs a signal for issuing an alarm to the display means 70. As a result, the display means 70 lights up and the user is alerted to the irregularity.

In the example shown in FIG. 6, a case where the frontward stabilizer bar 25 is stuck in a contorted state, so that a rolling moment to the left acts on the vehicle 1 is explained, but also the case of a rolling moment to the right is similar. In this case, the ECU 50 outputs to the rearward actuator 30 a driving signal to contort the rearward stabilizer bar 35 and let a rolling moment to the left act on the vehicle 1.

Moreover, also in the event that the rearward stabilizer bar 35 is stuck, the ECU 50 outputs a driving signal to the frontward actuator 20 in the same manner. That is to say, in the event that the rearward stabilizer bar 35 is stuck in a contorted state such that a rolling moment to the right acts on the vehicle 1, the ECU 50 outputs to the frontward actuator 20 a contorting driving signal that causes a rolling moment to the left to act on the vehicle 1. Furthermore, if the rearward stabilizer bar 35 is stuck in a contorted state such that a rolling moment to the left acts on the vehicle 1, the ECU 50 outputs to the frontward actuator 20 a contorting driving signal that causes a rolling moment to the right to act on the vehicle 1.

According to the present embodiment, the ECU 50 has a configuration provided with both a function for controlling the driving signal during a regular state (a function of the first control means) and a function for controlling the driving signal during an irregular state (a function of the second control means), but these control means can also be provided separately. In that case, the flowchart in FIG. 4 may also be separated between the Steps S103 and S104.

In the present embodiment, a display device 70 provided that alerts the user to irregularities, but if that is not necessary, a configuration without the display device 70 is also possible. Moreover, a configuration wherein the ECU 50 does not perform Step S107 in the flowchart in FIG. 4 is also possible.

INDUSTRIAL APPLICABILITY

The present invention can be applied to stabilizer control apparatuses used for achieving stabilization of rolling in a running vehicle.

Figure 1:
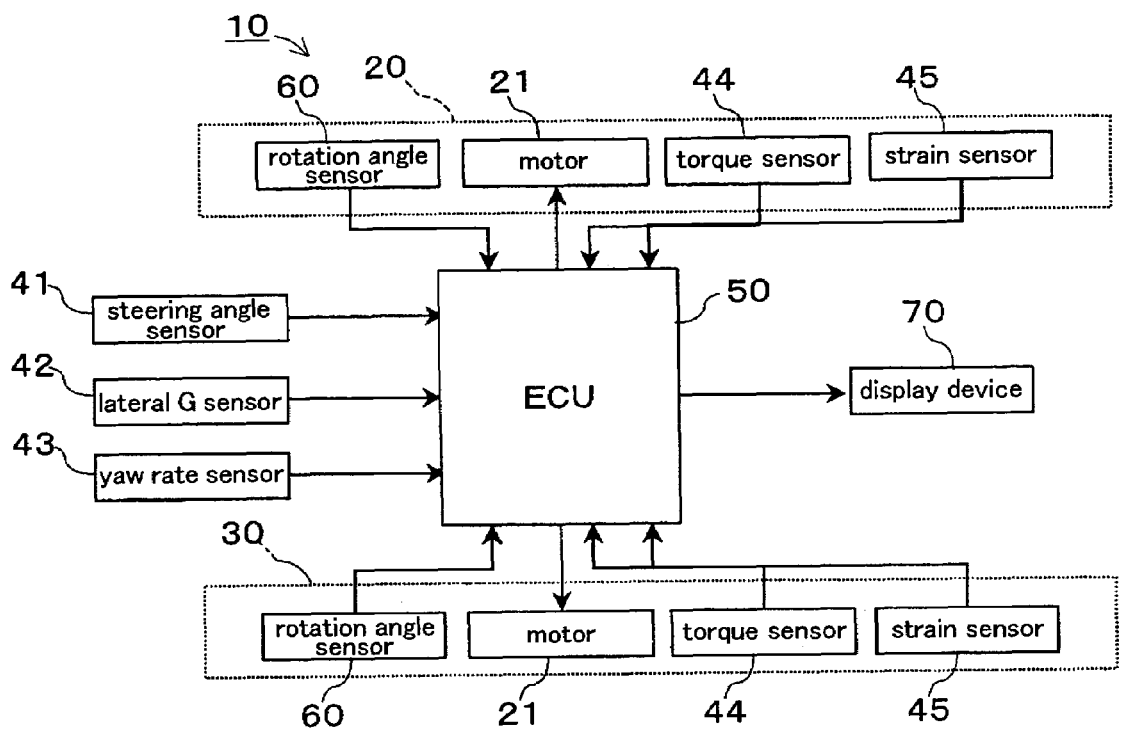
FIG. 1 is a block diagram showing the electric configuration of the stabilizer control apparatus.
Figure 2:
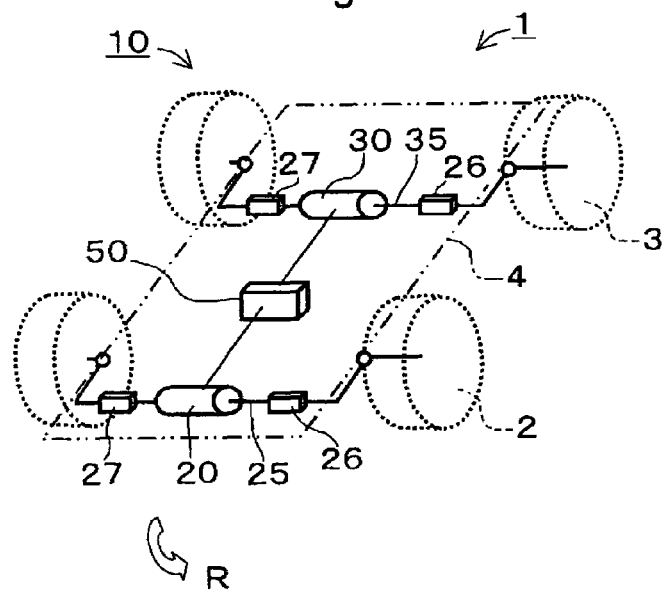
FIG. 2 is a figure showing the stabilizer control apparatus as it is mounted on the vehicle.
Figure 3:
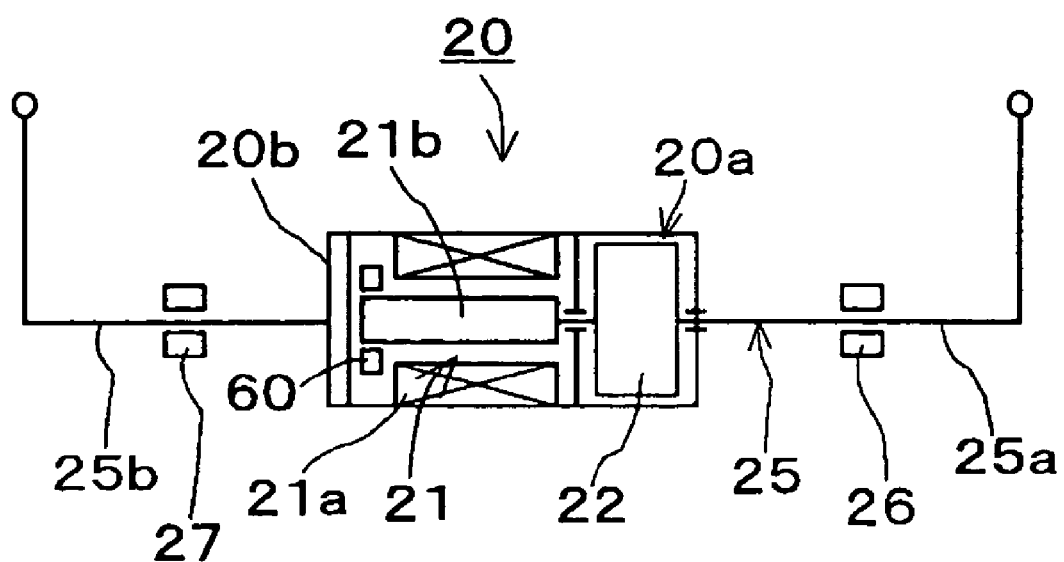
FIG. 3 is a figure showing the configuration of a stabilizer actuator included in the stabilizer control apparatus.
Figure 4:
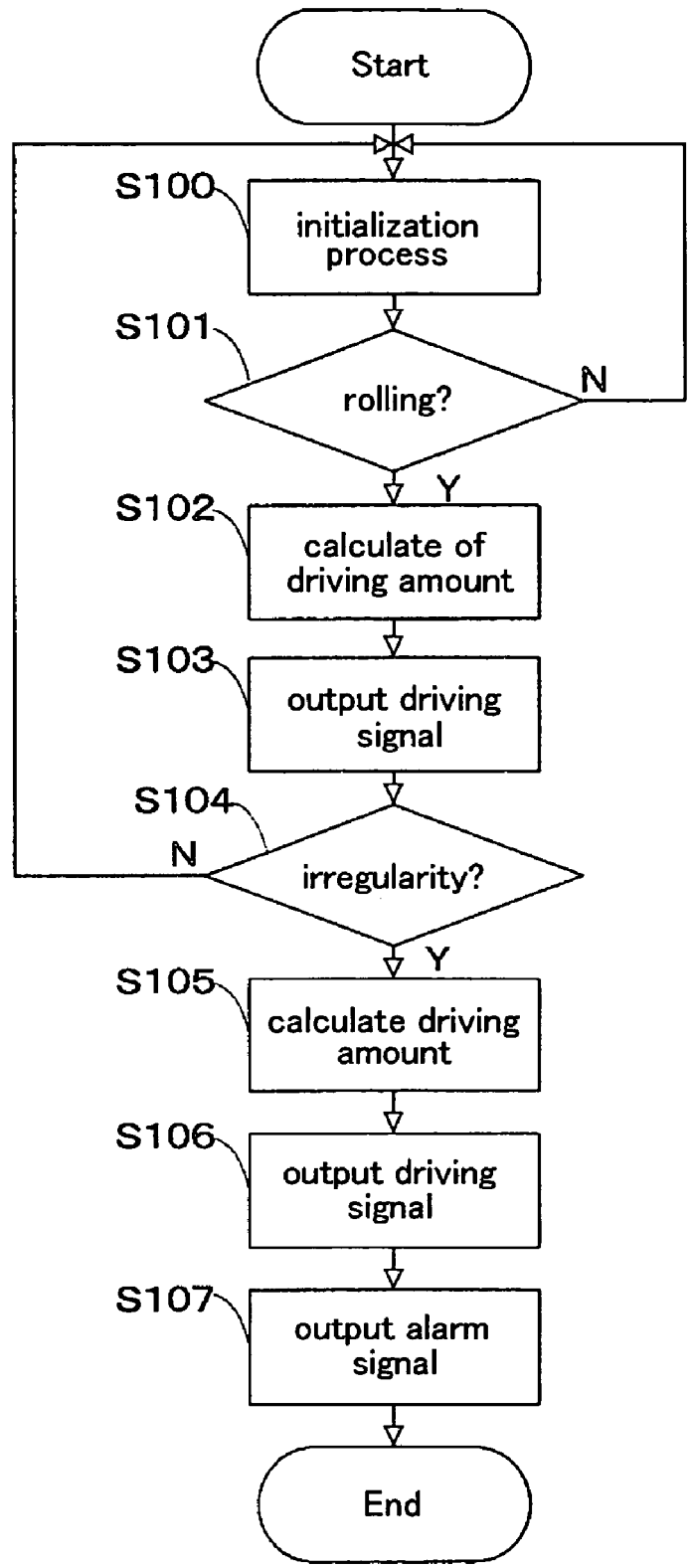
FIG. 4 is a flowchart showing the process performed by the control means of the stabilizer control apparatus.
Figure 5:
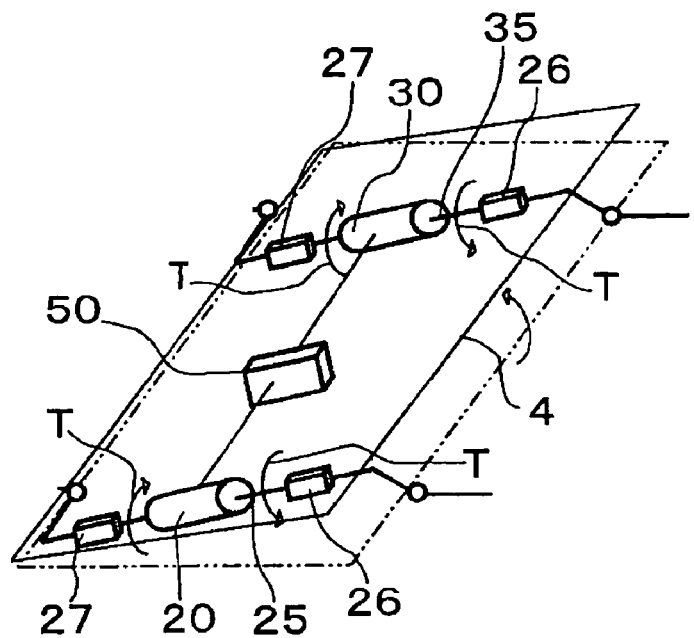
FIG. 5 is a figure illustrating a rolling moment to the right acting on the vehicle.
Figure 6:
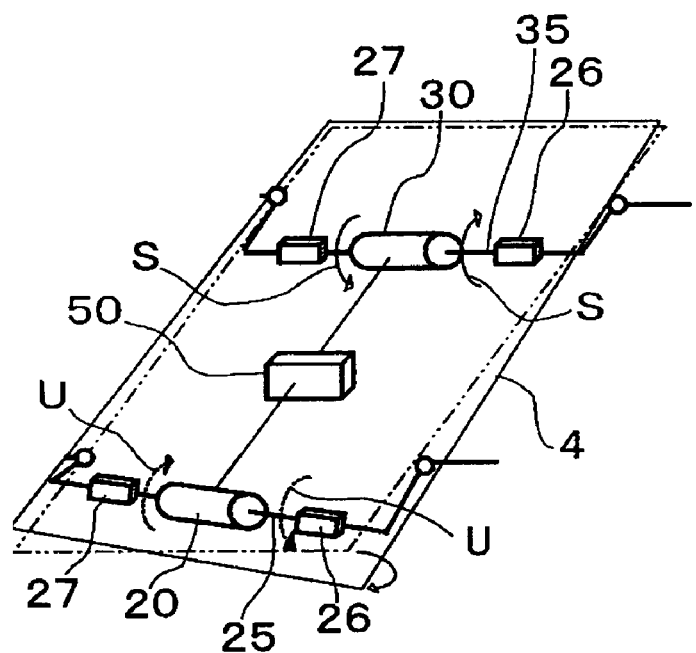
FIG. 6 is a figure showing the vehicle when an irregularity occurred to the vehicle and an external rolling moment does not act on it.
Figure 7:
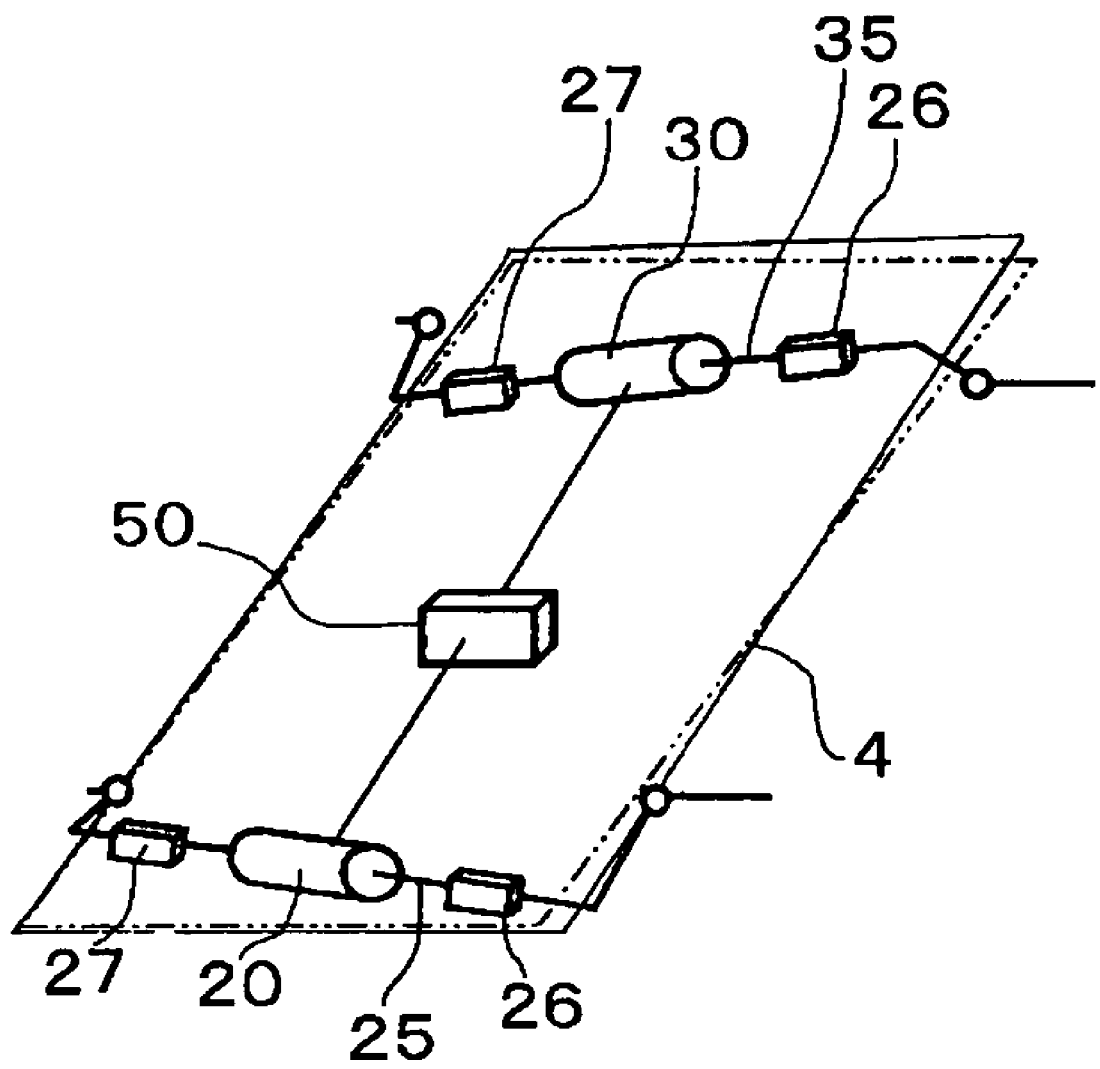
FIG. 7 is a figure showing the state when the rearward actuator of the vehicle is operated from the state shown in FIG. 6.

INDEX TO THE REFERENCE NUMERALS 10 stabilizer control apparatus
20 frontward stabilizer actuator (first driving means or second driving means)
25 frontward stabilizer bar (first stabilizer bar or second stabilizer bar)
30 rearward stabilizer actuator (second driving means or first driving means)
35 rearward stabilizer bar (second stabilizer bar or first stabilizer bar)
41 steering angle sensor (roll detecting means)
42 lateral G sensor (roll detecting means)
43 yaw rate sensor (roll detecting means)
44 torque sensor (roll detecting means)
45 strain sensor (roll detecting means)
50 ECU (first control means and second control means)
60 rotation angle sensor (contortion detecting means)
70 display device (alarm device)

The invention claimed is:

1. A stabilizer control apparatus, comprising:
a first stabilizer bar disposed at either the front wheels or the rear wheels of a vehicle;
a second stabilizer bar disposed at the other of the front wheels and the rear wheels;
a first driving means, disposed between the two ends of the first stabilizer bar, that can be driven so as to contort the first stabilizer bar between its two ends;
a second driving means, disposed between the two ends of the second stabilizer bar, that can be driven so as to contort the second stabilizer bar between its two ends;
a roll detecting means for detecting rolling of the vehicle;
a first control means, which, in the event that the roll detecting means has detected rolling of the vehicle, outputs to at least one of the first driving means and the second driving means a driving signal contorting at least one of the first stabilizer bar and the second stabilizer bar, so that a resisting rolling moment that counters the rolling acts on the vehicle; and
a second control means, which, in the event that an irregularity is detected that one of the first stabilizer bar and the second stabilizer bar is stuck in a contorted state such that a rolling moment to one side acts on the vehicle, outputs a driving signal contorting the other of the first stabilizer bar and the second stabilizer bar in a direction where the rolling moment to the one side is compensated, to the first driving means or the second driving means that drives the other stabilizer bar.

2. The stabilizer control apparatus according to claim 1, wherein, in the event that the irregularity has been detected, the second control means outputs a driving signal of an amount that corresponds to the driving amount of the first driving means or the second driving means that drives the first stabilizer bar or the second stabilizer bar where the irregularity was detected, to the first driving means or the second driving means driving the other of the first stabilizer bar and the second stabilizer bar.

3. The stabilizer control apparatus according to claim 1, further comprising contortion detecting means for detecting the degree of contortion of the first stabilizer bar and the second stabilizer bar;
wherein the second control means detects the irregularity of the first stabilizer bar from a set contortion value of the first stabilizer bar in accordance with the driving signal of the first control means and from the detection result of the contortion detection means, and detects the irregularity of the second stabilizer bar from a set contortion value of the second stabilizer bar in accordance with the driving signal of the first control means and from the detection result of the contortion detection means.

4. The stabilizer control apparatus according to claim 1, further comprising an alarm device;
wherein the second control means outputs a signal for issuing an alarm to the alarm device in the event that an irregularity is detected.

5. A stabilizer control apparatus, comprising:
a first stabilizer bar disposed at either the front wheels or the rear wheels of a vehicle;
a second stabilizer bar disposed at the other of the front wheels and the rear wheels;
a first driving means, disposed between the two ends of the first stabilizer bar, that can be driven so as to contort the first stabilizer bar between its two ends;
a second driving means, disposed between the two ends of the second stabilizer bar, that can be driven so as to contort the second stabilizer bar between its two ends;
a roll detecting means for detecting rolling of the vehicle;
a first control means, which, in the event that the roll detecting means has detected rolling of the vehicle, outputs to at least one of the first driving means and the second driving means a driving signal contorting at least one of the first stabilizer bar and the second stabilizer bar, so that a resisting rolling moment that counters the rolling acts on the vehicle; and
a second control means, which, in the event that an irregularity is detected that one of the first stabilizer bar and the second stabilizer bar is stuck in a contorted state, outputs a driving signal contorting the other of the first stabilizer bar and the second stabilizer bar such that tilting of a chassis of the vehicle is suppressed, to the first driving means or the second driving means that drives the other stabilizer bar.

6. The stabilizer control apparatus according to claim 5, wherein, in the event that the irregularity has been detected, the second control means outputs a driving signal of an amount that corresponds to the driving amount of the first driving means or the second driving means that drives the first stabilizer bar or the second stabilizer bar where the irregularity was detected, to the first driving means or the second driving means driving the other of the first stabilizer bar and the second stabilizer bar.

7. The stabilizer control apparatus according to claim 5, further comprising contortion detecting means for detecting the degree of contortion of the first stabilizer bar and the second stabilizer bar;
wherein the second control means detects the irregularity of the first stabilizer bar from a set contortion value of the first stabilizer bar in accordance with the driving signal of the first control means and from the detection result of the contortion detection means, and detects the irregularity of the second stabilizer bar from a set contortion value of the second stabilizer bar in accordance with the driving signal of the first control means and from the detection result of the contortion detection means.

8. The stabilizer control apparatus according to claim 5, further comprising an alarm device;
wherein the second control means outputs a signal for issuing an alarm to the alarm device in the event that an irregularity is detected.

9. A stabilizer control apparatus, comprising:
a first stabilizer bar disposed at either the front wheels or the rear wheels of a vehicle;
a second stabilizer bar disposed at the other of the front wheels and the rear wheels;
a first driving means, disposed between the two ends of the first stabilizer bar, that can be driven so as to contort the first stabilizer bar between its two ends;
a second driving means, disposed between the two ends of the second stabilizer bar, that can be driven so as to contort the second stabilizer bar between its two ends;
a roll detecting means for detecting rolling of the vehicle;
a first control means, which, in the event that the roll detecting means has detected rolling of the vehicle, outputs to the first driving means and the second driving means a driving signal contorting the first stabilizer bar and the second stabilizer bar, so that a resisting rolling moment that counters the rolling acts on the vehicle; and
a second control means, which, in the event that an irregularity is detected that the first stabilizer bar is stuck in a contorted state such that a rolling moment in one direction acts on the vehicle, outputs to the second driving means a driving signal contorting the second stabilizer bar such that a rolling moment in the other direction countering the rolling moment in the one direction acts on the vehicle.

10. The stabilizer control apparatus according to claim 9, further comprising a contortion detection means for detecting the degree of contortion of the first stabilizer bar,
wherein the second control means detects the irregularity from a set contortion value of the first stabilizer bar in accordance with the driving signal of the first control means and from the detection result of the contortion detection means.

11. The stabilizer control apparatus according to claim 9, further comprising an alarm device;
wherein the second control means outputs a signal for issuing an alarm to the alarm device in the event that an irregularity is detected.

12. A stabilizer control apparatus, comprising:
a first stabilizer bar disposed at either the front wheels or the rear wheels of a vehicle;
a second stabilizer bar disposed at the other of the front wheels and the rear wheels;
a first driving means, disposed between the two ends of the first stabilizer bar, that can be driven so as to contort the first stabilizer bar between its two ends;
a second driving means, disposed between the two ends of the second stabilizer bar, that can be driven so as to contort the second stabilizer bar between its two ends;
a roll detecting means for detecting rolling of the vehicle;
a first control means, which, in the event that the roll detecting means has detected rolling of the vehicle, outputs to the first driving means and the second driving means a driving signal contorting the first stabilizer bar and the second stabilizer bar, so that a resisting rolling moment that counters the rolling acts on the vehicle; and
a second control means, which, in the event that an irregularity is detected that the first stabilizer bar is stuck in a contorted state, outputs to the second driving means a driving signal contorting the second stabilizer bar such that tilting of a chassis of the vehicle is suppressed.

13. The stabilizer control apparatus according to claim 12, further comprising a contortion detection means for detecting the degree of contortion of the first stabilizer bar,
wherein the second control means detects the irregularity from a set contortion value of the first stabilizer bar in accordance with the driving signal of the first control means and from the detection result of the contortion detection means.

14. The stabilizer control apparatus according to claim 12, further comprising an alarm device; wherein the second control means outputs a signal for issuing an alarm to the alarm device in the event that an irregularity is detected.

* * * * *